(12) United States Patent
Ragazzi

(10) Patent No.: US 10,336,158 B2
(45) Date of Patent: Jul. 2, 2019

(54) METHOD AND SYSTEM FOR HEATING A VEHICLE

(71) Applicant: Ford Global Technologies, LLC, Dearborn, MI (US)

(72) Inventor: Franco Ragazzi, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 783 days.

(21) Appl. No.: 14/143,324

(22) Filed: Dec. 30, 2013

(65) Prior Publication Data
US 2015/0183296 A1  Jul. 2, 2015

(51) Int. Cl.
*B60H 1/22* (2006.01)
*B60H 1/03* (2006.01)

(52) U.S. Cl.
CPC ............ *B60H 1/2221* (2013.01); *B60H 1/03* (2013.01); *B60H 1/034* (2013.01); *B60H 2001/2228* (2013.01)

(58) Field of Classification Search
CPC ........ B60H 1/2221; B60H 1/034; B60H 1/03; B60H 2001/2228
See application file for complete search history.

(56) References Cited

U.S. PATENT DOCUMENTS

| | | | | |
|---|---|---|---|---|
| 6,077,158 A * | 6/2000 | Lake | ................. | B60H 1/00278 165/249 |
| 6,557,773 B2 * | 5/2003 | Stemmler | ............ | B60H 1/2203 165/41 |
| 7,380,586 B2 * | 6/2008 | Gawthrop | .............. | B60H 1/004 165/202 |
| 7,789,179 B2 | 9/2010 | Steiner et al. | | |
| 7,870,892 B2 * | 1/2011 | Gawthrop | .............. | B60H 1/004 165/202 |
| 8,931,547 B2 * | 1/2015 | Yen | .................... | B60H 1/00392 165/202 |
| 9,067,476 B2 * | 6/2015 | Park | ................... | B60H 1/00385 |
| 9,358,969 B2 * | 6/2016 | Yamazaki | ............. | B60W 20/14 |
| 2005/0247446 A1 * | 11/2005 | Gawthrop | .............. | B60H 1/004 165/202 |
| 2010/0084112 A1 | 4/2010 | Piccard et al. | | |

(Continued)

FOREIGN PATENT DOCUMENTS

| | | |
|---|---|---|
| CN | 102086801 A | 6/2011 |
| CN | 102958720 A | 3/2013 |
| DE | 102011090195 A1 | 7/2013 |

OTHER PUBLICATIONS

"Heat for every drive concept: Eberspaecher supplies efficient systems for electric and hybrid cars," Public Relations Eberspächer Group, http://www.eberspaecher.com/nc/en/press/press-releases/individual-view/article/heat-for-every-drive-concept-eberspaecher-supplies-efficient-systems-for-electric-and-hybrid-cars/419.html, Updated Jan. 18, 2013, pp. 1-4.

(Continued)

*Primary Examiner* — Ibrahime A Abraham
*Assistant Examiner* — Biniam B Asmelash
(74) *Attorney, Agent, or Firm* — David Kelley; McCoy Russell LLP

(57) ABSTRACT

Methods and system for providing heat to a vehicle are presented. In one example, a positive temperature coefficient (PTC) heater provides heat to a passenger cabin and an engine via heating engine coolant. Additionally, a heat pump may supply heat to the passenger cabin via heating the engine coolant.

13 Claims, 5 Drawing Sheets

(56) References Cited

U.S. PATENT DOCUMENTS

| | | | | |
|---|---|---|---|---|
| 2010/0326127 A1* | 12/2010 | Oomura | ............. | B60H 1/00785 62/498 |
| 2011/0005255 A1* | 1/2011 | Tanihata | ............ | B60H 1/00785 62/238.7 |
| 2011/0016896 A1* | 1/2011 | Oomura | ............. | B60H 1/00785 62/155 |
| 2011/0120146 A1* | 5/2011 | Ota | .................... | B60H 1/00885 62/3.3 |
| 2012/0122000 A1* | 5/2012 | Lee | ..................... | B60H 1/2218 429/429 |
| 2012/0132392 A1* | 5/2012 | Park | .................. | B60H 1/00385 165/42 |
| 2012/0205088 A1 | 8/2012 | Morisita et al. | | |
| 2013/0068443 A1* | 3/2013 | Yen | ................... | B60H 1/00392 165/253 |
| 2014/0075962 A1* | 3/2014 | Freese | .................... | F25B 21/04 62/3.3 |
| 2014/0342260 A1* | 11/2014 | Koyama | ................. | B60L 1/003 429/440 |

OTHER PUBLICATIONS

"PCT Heating Systems for Vehicle Body Manufacturers and Small OEMs," Eberspächer Climate Control Systems GmbH & Co. KG, Document No. 8670185, Version Sep. 2013, 8 pages.

"PCT Heater for Electric Vehicles and Plug-in Hybrid Vehicles Using Water Heat Carrier," Mitsubishi Heavy Industries Technical Review, vol. 46, No. 4, pp. 19-21, Dec. 2010, 3 pages.

Smith, Mark G. et al., "Climate Control System," U.S. Appl. No. 14/010,057, filed Aug. 26, 2013, 14 pages.

Anonymous, "Intelligent Auxiliary Water Heater Pump Control for Automotive Applications," IPCOM No. 000138732, Published Jul. 31, 2006, 3 pages.

State Intellectual Property Office of the People's Republic of China, Office Action and Search Report Issued in Application No. 201410835784.X, dated Dec. 11, 2017, 9 pages. (Submitted with Partial Translation).

* cited by examiner

METHOD AND SYSTEM FOR HEATING A VEHICLE

FIELD

The present description relates to methods and a system for improving heating of a vehicle. The methods and system may be particularly useful for vehicles that are solely electrically propelled or vehicles that may include an engine that may be stopped during vehicle operation to improve hydrocarbon fuel economy.

BACKGROUND AND SUMMARY

A passenger cabin of a vehicle may be heated via an engine when ambient temperatures are low. However, some hybrid vehicles may operate without activating the engine for a period of time to conserve hydrocarbon fuel. For such vehicles, it may be desirable to provide an alternative way of heating the passenger cabin. One way to heat a passenger cabin without starting an engine may be to supply heat to the passenger cabin via a heat pump. The heat pump extracts heat from ambient conditions to heat the passenger cabin. Heat pumps are effective at some temperatures, but their efficiency may degrade at lower temperatures. Therefore, it may be desirable to heat a vehicle's passenger cabin via a different device.

The inventor herein has recognized the above-mentioned disadvantages and has developed a method for heating a vehicle, comprising: increasing temperature of a coolant in a coolant loop that includes a heater core via supplying electrical current to a positive temperature coefficient (PTC) heater in response to ambient temperature being less than a threshold temperature; and increasing temperature of the coolant via heat transferred from a heat pump in response to ambient temperature being greater than the threshold temperature.

By heating coolant using a PTC heater and\or a heat pump, it may be possible to provide the technical result of heating a vehicle's passenger cabin over a wide range of ambient temperatures. Further, since coolant is heated by the PTC heater and the heat pump, many components of a non-hybrid vehicle may be used commonly with a hybrid vehicle or electric vehicle. For example, a ventilation system for a passenger cabin may be used commonly between hybrid and non-hybrid vehicles since coolant is the heat transfer medium in both types of vehicles. Additionally, an engine may be heated via the PTC heaters so that engine emissions and fuel consumption may be reduced.

The present description may provide several advantages. Specifically, the approach may improve passenger cabin heating of electric and hybrid vehicles. Further, the approach may reduce fuel consumption and vehicle emissions by warming an engine via a vehicle's kinetic energy. Further still, the approach may improve a vehicle's electric propulsion range by reducing charge consumed from a battery to heat a passenger cabin.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
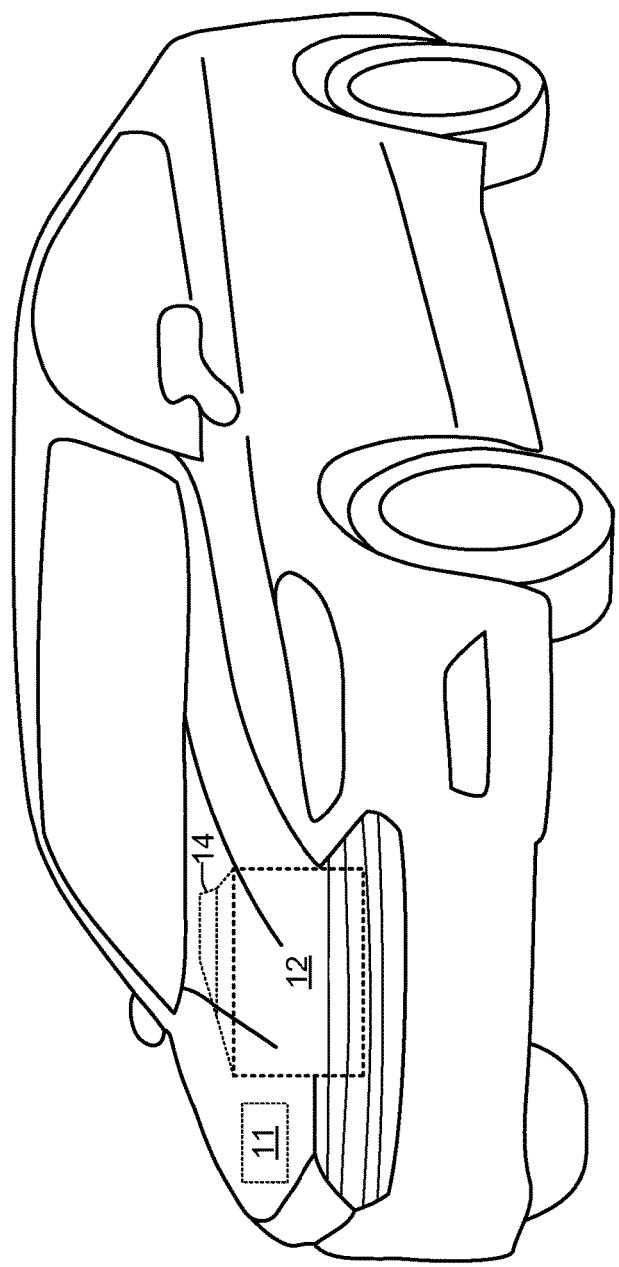
FIG. 1 is a schematic diagram of a vehicle.
Figure 2:
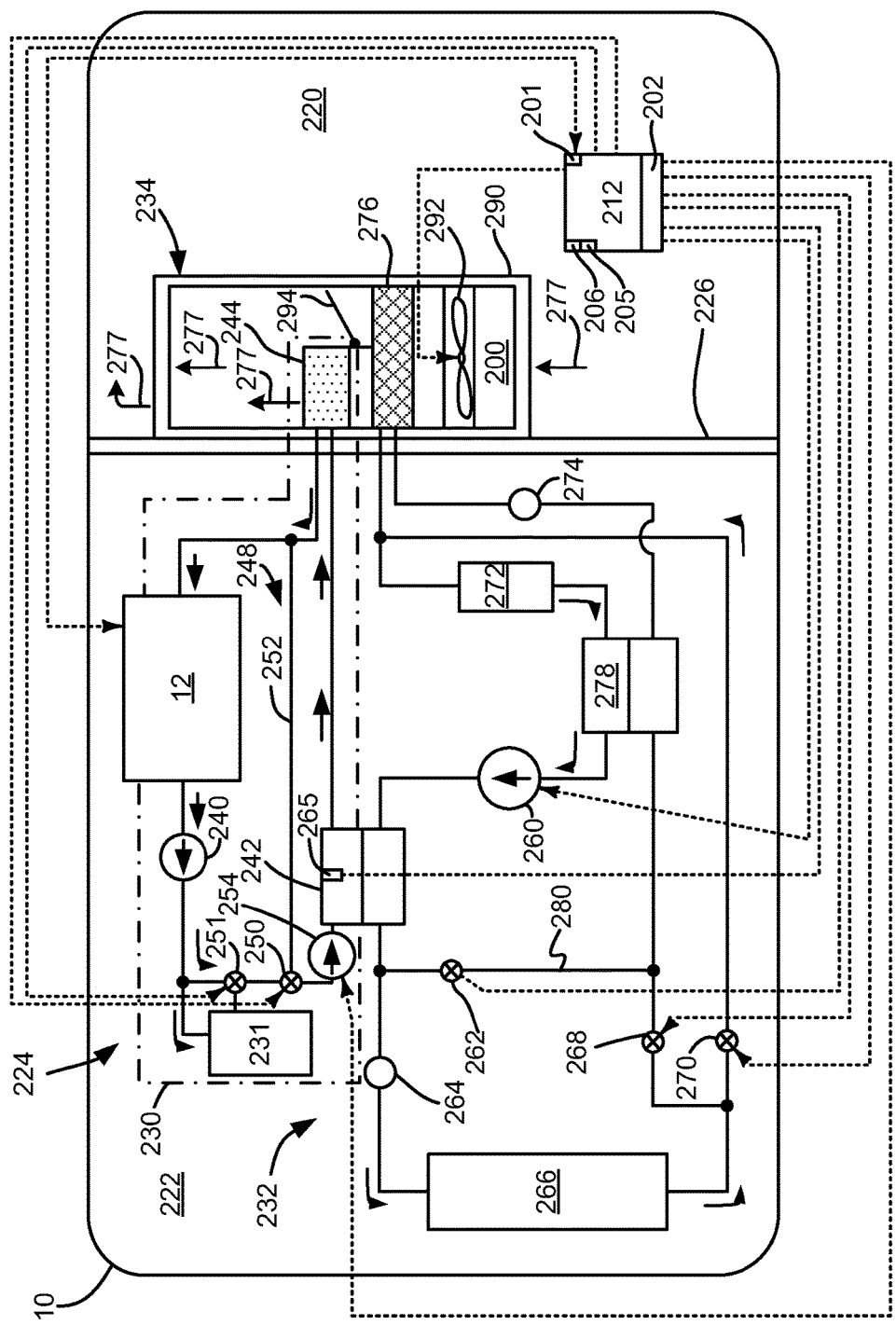
FIG. 2 shows an example vehicle heating system for the vehicle of FIG. 1.
Figure 3:
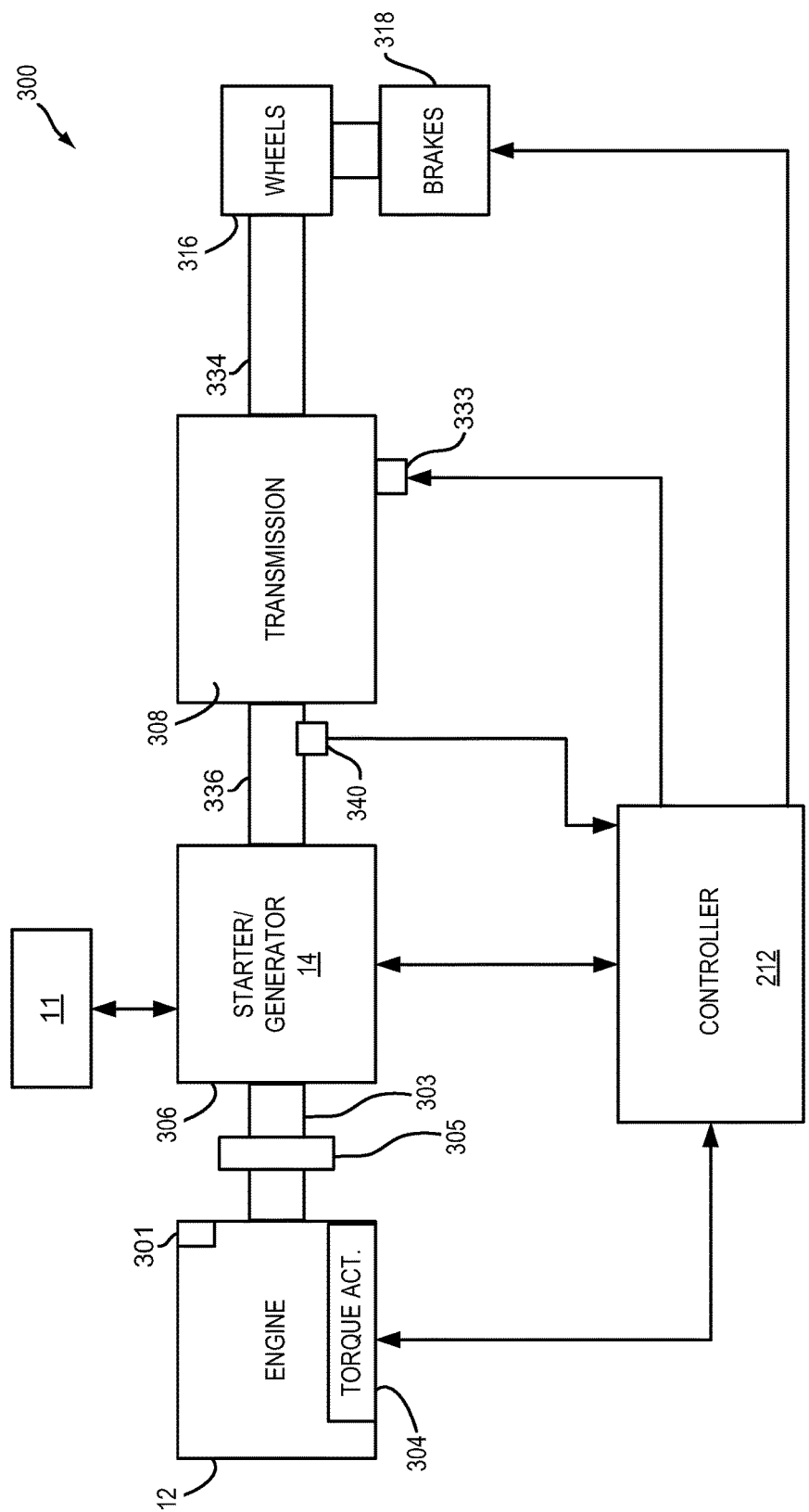
FIG. 3 shows an example vehicle driveline for the vehicle of FIG. 1.

The present description is related to providing heat to a vehicle. In particular, a vehicle's coolant loop may be heated to warm a passenger compartment and/or an engine when the engine is not operating. The vehicle may be a passenger vehicle as is shown in FIG. 1 or a commercial vehicle (not shown). The vehicle includes a climate control system as is shown in FIG. 2. The climate control system may include an engine that is part of a hybrid powertrain as is shown in FIG. 3. Heat may be provided to the vehicle based on the method of FIG. 4. The vehicle may be heated as shown in the operation sequence of FIG. 5 according to the method of FIG. 4.

Referring to FIG. 1, a vehicle 10 including an engine 12, an electrical machine, and an electrical energy storage device 11 is shown. In one example, the vehicle may be propelled solely via the engine 12, solely via the electrical machine 14, or by both the engine 12 and the electrical machine 14. The electrical machine may be supplied electrical power via the electrical energy storage device 11. The electrical energy storage device 11 may be recharged via engine 12 providing power to electrical machine 14 and electrical machine outputting electrical energy to electric energy storage device 11. Alternatively, electrical energy storage device may be recharged via converting the vehicle's kinetic energy into electrical energy via electrical machine 14 during vehicle deceleration or hill descent. Electrical energy storage device 11 may also be recharged from a stationary power grid via a home charging system or a remote charging system (e.g., a charging station). In one example, electrical energy storage device 11 is a battery. Alternatively, electrical energy storage device 11 may be a capacitor or other storage device.

Referring now to FIG. 2, a vehicle heating system or climate control system 224 is shown. Devices and fluidic passages or conduits are shown as solid lines. Electrical connections are shown as dashed lines.

The vehicle 10 may include a driveline as shown in FIG. 3 or another suitable driveline to propel the vehicle 10 and/or power vehicle components. Vehicle 10 is shown with internal combustion engine 12, and it may be selectively coupled to an electric machine (not shown). Internal combustion engine 12 may combust petrol, diesel, alcohol, hydrogen, or a combination of fuels.

The vehicle 10 may include a passenger compartment 220, an engine compartment 222, and a climate control system 224. The passenger compartment 220 may be within vehicle 10 and it may receive one or more occupants. A portion of climate control system 224 may be positioned in passenger compartment 220.

Engine compartment 222 may be positioned proximate to passenger compartment 220. One or more power sources, such as internal combustion engine 12, as well as a portion of climate control system 224 may be within engine compartment 222. Engine compartment 222 may be isolated from the passenger compartment 220 via bulkhead 226. The climate control system 224 may circulate air and/or control or modify the temperature of air that is circulated in the passenger compartment 220. Further, the internal combustion engine 12 may be heated via climate control system 224 to reduce fuel consumption and emissions. The climate control system 224 may include a coolant subsystem 230, a heat pump subsystem 232, and a ventilation subsystem 234.

The coolant subsystem 230, which may also be referred to as a coolant loop, may circulate a coolant, such as glycol, to cool the internal combustion engine 12. For example, waste heat that is generated by the internal combustion engine 12 when the engine is running or operational may be transferred to the coolant and then circulated to radiator 231 to cool internal combustion engine 12. In at least one example, the coolant subsystem 230 may include a coolant pump 240, an intermediate heat exchanger 242, electrically activated positive temperature coefficient (PTC) heater 265 incorporated into intermediate heat exchanger 242 and submerged in coolant, a heater core 244, and a bypass loop 248 that may be fluidly interconnected by conduits or passages such as tubes, hoses, pipes, or the like. The coolant subsystem 230 includes radiator 231 for transferring thermal energy to the ambient air surrounding the vehicle 10. Coolant subsystem 230 also includes electrically operated valves 250 and 251 for adjusting coolant flow through engine 12, radiator 231, and intermediate heat exchanger 242. Electrically operated valves 250 and 251 are selectively operated via controller 212.

The coolant pump 240 may circulate coolant through the coolant subsystem 230. The coolant pump 240 may be powered by an electrical or non-electrical power source. For example, the coolant pump 240 may be operatively coupled to an internal combustion engine 12 via a belt, or alternatively may be driven by an electrically powered motor. The coolant pump 240 may receive coolant from the internal combustion engine 12 and circulate the coolant in a closed loop. For example, when the climate control system 224 is in a heating mode, coolant may be routed from the coolant pump 240 to the intermediate heat exchanger 242, bypassing radiator 231, and then to the heater core 244 before returning to the internal combustion engine 12 as represented by the arrowed lines. When internal combustion engine 12 is outputting a higher level of thermal energy, coolant may flow from pump 240 to radiator 231 before returning to internal combustion engine 12 via intermediate heat exchanger 242 and heater core 244. Electrically operated valve 251 directs coolant from pump 240 through radiator 231 or around radiator 231 and to electrically operated valve 254. Coolant may flow through or around engine 12 based on the position of electrically actuated valve 250.

The intermediate heat exchanger 242 may facilitate the transfer of thermal energy between the coolant subsystem 230 and the heat pump subsystem 232. In particular, heat may be transferred from heat pump subsystem 232 to coolant subsystem 230. The intermediate heat exchanger 242 may be part of the coolant subsystem 230 and the heat pump subsystem 232. The intermediate heat exchanger 242 may have any suitable configuration. For example, the intermediate heat exchanger 242 may have a plate-fin, tube-fin, or tube-and-shell configuration that may facilitate the transfer of thermal energy from heat pump subsystem 232 to coolant subsystem 230 without mixing or exchanging the heat transfer fluids in the coolant subsystem 230 and heat pump subsystems 232. Heat may be transferred from the heat pump subsystem 232 to the coolant via the intermediate heat exchanger 242 when the climate control system 224 is in a heating mode. Intermediate heat exchanger 242 includes an integral electrically operated positive temperature coefficient (PTC) heater 265. PTC heater may be activated via controller 12 in response to a request to heat cabin 220 and/or a request to heat internal combustion engine 12.

The heater core 244 may transfer thermal energy from the coolant to air in the passenger compartment 220. The heater core 244 may be positioned in the passenger compartment 220 in the ventilation subsystem 234 and may have any suitable configuration. For example, the heater core 244 may have a plate-fin or tube-fin construction in one or more examples.

The bypass loop 248 may route coolant such that the coolant is not heated by the internal combustion engine 12. A bypass loop control valve 250 may control the flow of coolant through the bypass loop 248. More specifically, the bypass loop control valve 250 may permit coolant to flow through a bypass line 252 and inhibit the flow of coolant from internal combustion engine 12 to the intermediate heat exchanger 242 when in a first position. In such a position, a second coolant pump 254 may circulate coolant through the bypass loop 248 from the intermediate heat exchanger 242 to the heater core 244 to the bypass line 252 and back to the second coolant pump 254. As such, the coolant in the coolant subsystem 230 may be heated independently by the heat pump subsystem 232 via the intermediate heat exchanger 242, or PTC heaters 265, or via the intermediate heat exchanger 242 and PTC heaters 265 in some operation modes. The bypass loop control valve 250 may also inhibit the flow of coolant through the bypass line 252 when in a second position. The second coolant pump 254 may or may not circulate coolant when coolant does not flow through the bypass line 252.

The heat pump subsystem 232 may transfer thermal energy to or from the passenger compartment 220 and to or from the coolant subsystem 230. In at least one example, the heat pump subsystem 232 may be configured as a vapor compression heat pump subsystem in which a fluid is circulated through the heat pump subsystem 232 to transfer thermal energy to or from the passenger compartment 220. The heat pump subsystem 232 may operate in various modes, including, but not limited to a cooling mode and a heating mode. In the cooling mode, the heat pump subsystem 232 may circulate a heat transfer fluid, which may be called a refrigerant, to transfer thermal energy from inside the passenger compartment 220 to outside the passenger compartment 220. In a heating mode, the heat pump subsystem 232 may transfer thermal energy from the refrigerant to the coolant via the intermediate heat exchanger 242 without circulating the refrigerant through a heat exchanger in the passenger compartment 220.

In heating mode, heat pump subsystem 232 may include a pump 260, a first control valve 262, a first expansion device 264, an exterior heat exchanger 266, a second control valve 268, a third control valve 270, an accumulator 272, a second expansion device 274, an interior heat exchanger 276, and an optional internal heat exchanger 278. Components of the heat pump subsystem 232 may be in fluidic communication via one or more conduits, such as a tube, hose or the like. In FIG. 2, the refrigerant circulation path when in the heating mode is represented by the arrowed lines.

The pump 260, which may also be called a compressor, may pressurize and circulate the refrigerant through the heat pump subsystem 232. The pump 260 may be powered by an electrical or non-electrical power source. For example, the pump 260 may be operatively coupled to internal combustion engine 12 or driven by an electrically powered motor. In a heating mode, the pump 260 may provide high pressure refrigerant to the intermediate heat exchanger 242, which in turn may transfer heat from the high pressure refrigerant to coolant passing through the intermediate heat exchanger 242 to heat coolant flowing in coolant subsystem 230.

The first control valve 262 may be positioned along a bypass path 280 that may be positioned between the intermediate heat exchanger 242 and the first expansion device 264. The bypass path 280 may permit some refrigerant to bypass the first expansion device 264 and the exterior heat exchanger 266 and flow to the internal heat exchanger 278 (if provided), the second expansion device 274, and the interior heat exchanger 276 when the first control valve 262 is open. The first control valve 262 may be closed to inhibit the flow of refrigerant through the bypass path 280 to the interior heat exchanger 276 when in heating mode.

The first expansion device 264 may be positioned between and may be in fluidic communication with intermediate heat exchanger 242 and the exterior heat exchanger 266. The first expansion device 264 may be provided to change the pressure of the refrigerant. For example, the first expansion device 264 may be a thermal expansion valve (TXV) or a fixed or variable position valve that may or may not be externally controlled. The first expansion device 264 may reduce the pressure of the refrigerant that passes through the first expansion device 264 from the intermediate heat exchanger 242 to the exterior heat exchanger 266. Therefore, high pressure refrigerant received from the intermediate heat exchanger 242 may exit the first expansion device 264 at a lower pressure and as a liquid and vapor mixture in the heating mode.

The exterior heat exchanger 266 may be positioned outside the passenger compartment 220. In a cooling mode or air conditioning context, the exterior heat exchanger 266 may function as a condenser and may transfer heat to the surrounding environment to condense the refrigerant from a vapor to a liquid. In a heating mode, the exterior heat exchanger 266 may function as an evaporator and may transfer heat from the surrounding environment to the refrigerant, thereby causing the refrigerant to vaporize.

The second control valve 268 may be positioned between the exterior heat exchanger 266 and the bypass path 280. The second control valve 268 may be a check valve and it may inhibit the flow of refrigerant from the bypass path 280 to the exterior heat exchanger 266. As such, refrigerant exiting the exterior heat exchanger 266 when the climate control system 224 is in the heating mode may be routed to the third control valve 270.

A third control valve 270 may be positioned between the exterior heat exchanger 266 and the accumulator 272. The third control valve 270 may help control the flow of refrigerant that exits the exterior heat exchanger 266. In the heating mode, the third control valve 270 may be open to permit refrigerant to flow from the exterior heat exchanger 266 to the accumulator 272. The third control valve 270 may be closed and the second expansion device 274 may be opened in other modes, such as a cooling mode.

The accumulator 272 may act as a reservoir for storing any residual liquid refrigerant so that vapor refrigerant rather than liquid refrigerant may be provided to the pump 260. The accumulator 272 may include a desiccant that absorbs small amounts of water moisture from the refrigerant.

The second expansion device 274 may be positioned between and may be in fluidic communication to the exterior heat exchanger 266 and the interior heat exchanger 276. The second expansion device 274 may have a similar structure as the first expansion device 264 and may be provided to change the pressure of the refrigerant similar to the first expansion device 264. In addition, the second expansion device 274 may be closed to inhibit the flow of refrigerant. More specifically, the second expansion device 274 may be closed to inhibit the flow of refrigerant from the exterior heat exchanger 266 to the interior heat exchanger 276 in the heating mode. As such, closing the second expansion device 274 may inhibit the flow of refrigerant through the second control valve 268 to the internal heat exchanger 278 (if provided), as well as through the interior heat exchanger 276.

The interior heat exchanger 276 may be fluidly connected to the second expansion device 274. The interior heat exchanger 276 may be positioned inside the passenger compartment 220. In a cooling mode or air conditioning context, the interior heat exchanger 276 may function as an evaporator and may receive heat from air in the passenger compartment 220 to vaporize the refrigerant. Refrigerant exiting the interior heat exchanger 276 may be routed to the accumulator 272. In the heating mode, refrigerant may not be routed to the interior heat exchanger 276 due to the closure of the second expansion device 274.

The internal heat exchanger 278, if provided, may transfer thermal energy between refrigerant flowing through different regions of the heat pump subsystem 232. The internal heat exchanger 278 may be positioned outside the passenger compartment 220. In a cooling mode or air conditioning context, heat may be transferred from refrigerant that is routed from the exterior heat exchanger 266 to the interior heat exchanger 276 to refrigerant that is routed from the accumulator 272 to the pump 260. In the heating mode, the internal heat exchanger 278 does not transfer thermal energy between such refrigerant flow paths since the second expansion device 274 is closed, thereby inhibiting the flow of refrigerant through a portion of the internal heat exchanger 278.

The ventilation subsystem 234 may circulate air in the passenger compartment 220 of the vehicle 10. The ventilation subsystem 234 may have a housing 290, a blower 292, and a temperature door 294.

The housing 290 may receive components of the ventilation subsystem 234. In FIG. 2, the housing 290 is illustrated such that internal components are visible rather than hidden for clarity. In addition, airflow through the housing 290 and internal components is represented by the arrowed lines 277. The housing 290 may be at least partially positioned in the passenger compartment 220. For example, the housing 290 or a portion thereof may be positioned under an instrument panel of the vehicle 10. The housing 290 may have an air intake portion 200 that may receive air from outside the vehicle 10 and/or air from inside the passenger compartment 220. For example, the air intake portion 200 may receive ambient air from outside the vehicle 10 via an intake passage, duct, or opening that may be located in any suitable location, such as proximate a cowl, wheel well, or other vehicle body panel. The air intake portion 200 may also receive air from inside the passenger compartment 220 and recirculate such air through the ventilation subsystem 234. One or more doors or louvers may be provided to permit or inhibit air recirculation.

The blower 292 may be positioned in the housing 290. The blower 292, which may also be called a blower fan, may be positioned near the air intake portion 200 and may be configured as a centrifugal fan that may circulate air through the ventilation subsystem 234.

The temperature door 294 may be positioned between the interior heat exchanger 276 and the heater core 244. In the example shown, the temperature door 294 is positioned downstream of the interior heat exchanger 276 and upstream of the heater core 244. The temperature door 294 may block or permit airflow through the heater core 244 to help control the temperature of air in the passenger compartment 220. For example, the temperature door 294 may permit airflow through the heater core 244 in the heating mode such that heat may be transferred from the coolant to air passing through the heater core 244. This heated air may then be provided to a plenum for distribution to ducts and vents or outlets located in the passenger compartment 220. The temperature door 294 may be moved between a plurality of positions to provide air having a desired temperature. In FIG. 2, the temperature door 294 is shown in a full heat position in which airflow is directed through the heater core 244.

Figure 4:
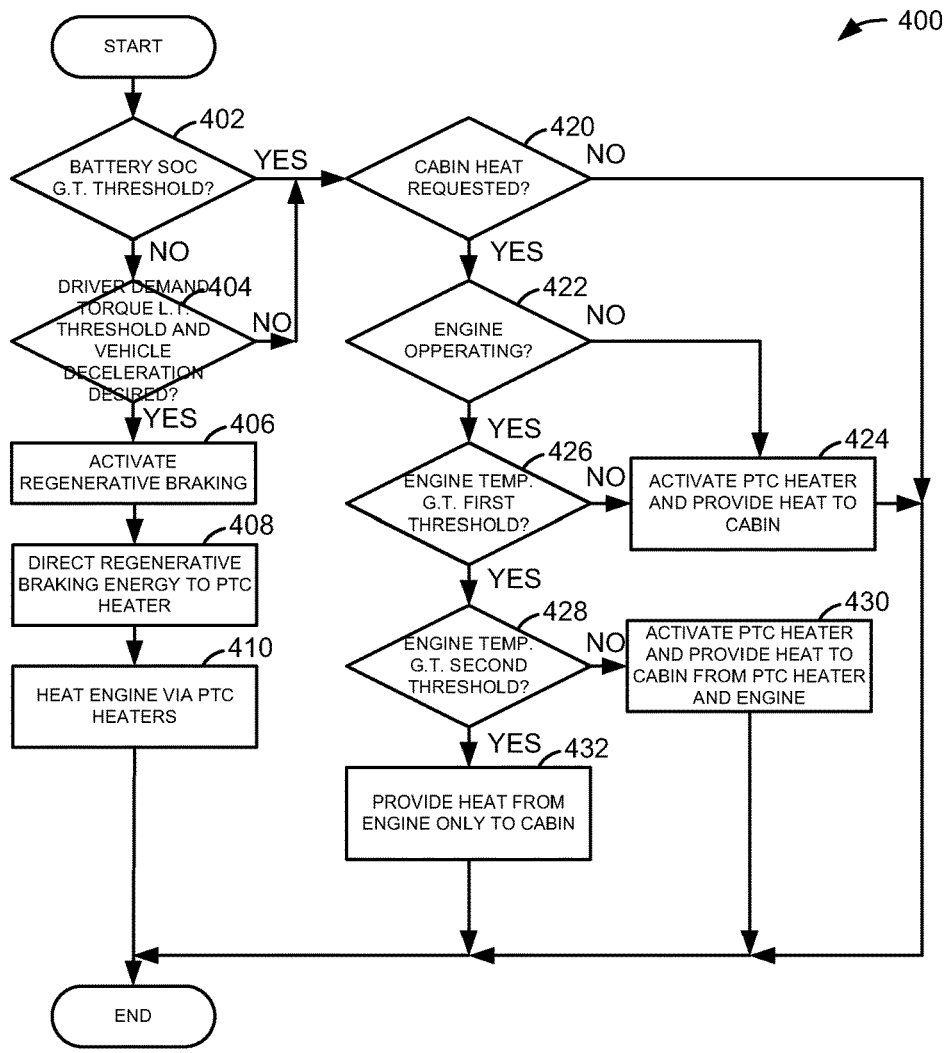
FIG. 4 shows a method for operating a heating system.

Controller 212 includes executable instructions of the method in FIG. 4 to operate the valves, fans, and pumps or compressors of the system shown in FIG. 2. Controller 212 includes inputs 201 and outputs 202 to interface with devices in the system of FIG. 2. Controller 212 also includes a central processing unit 205 and non-transitory memory 206 for executing the method of FIG. 4.

Referring now to FIG. 3, a block diagram of a vehicle driveline 300 in vehicle 10 is shown. Driveline 300 may be powered by engine 12. Engine 12 may be started with an engine starting system including starter 301 or via electric machine or driveline integrated starter generator (DISG) 14. Further, engine 12 may generate or adjust torque via torque actuator 304, such as a fuel injector, throttle, camshaft, etc.

An engine output torque may be transmitted to driveline disconnect clutch 305. Driveline disconnect clutch selectively couples and decouples driveline 300. Driveline disconnect clutch 305 may be electrically or hydraulically actuated. The downstream side of driveline disconnect clutch 305 is shown mechanically coupled to DISG input shaft 303.

DISG 14 may be operated to provide torque to driveline 300 or to convert driveline torque into electrical energy to be stored in electric energy storage device 11. DISG 14 has a power output that is greater than starter 301. Further, DISG 14 directly drives driveline 300 or is directly driven by driveline 300. There are no belts, gears, or chains to couple DISG 14 to driveline 300. Rather, DISG 14 rotates at the same rate as driveline 300. Electrical energy storage device 11 may be a battery, capacitor, or inductor. The downstream side of DISG 14 is mechanically coupled to transmission 308.

Automatic transmission 333 includes gear clutches (e.g., gears 1-6) for adjusting a transmission gear ratio. The gear clutches 333 may be selectively engaged to propel vehicle 10. Torque output from the automatic transmission 308 may in turn be relayed to wheels 316 to propel the vehicle via output shaft 334. Output shaft 334 delivers torque from transmission 308 to wheels 316. Automatic transmission 308 may transfer an input driving torque to the wheels 316.

Further, a frictional force may be applied to wheels 316 by engaging wheel friction brakes 318. In one example, wheel friction brakes 318 may be engaged in response to the driver pressing his foot on a brake pedal (not shown). In other examples, controller 212 or a controller linked to controller 12 may apply engage wheel friction brakes. In the same way, a frictional force may be reduced to wheels 316 by disengaging wheel friction brakes 318 in response to the driver releasing his foot from a brake pedal. Further, vehicle brakes may apply a frictional force to wheels 316 via controller 212 as part of an automated engine stopping procedure.

Controller 212 may be programmed to receive inputs from engine 12 and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 212 may control the engine torque output by controlling a combination of fuel pulse width, fuel pulse timing, and air charge. In all cases, engine control may be performed on a cylinder-by-cylinder basis to control the engine torque output. Controller 212 may also control torque output and electrical energy production from DISG by adjusting current flowing to and from DISG windings as is known in the art.

When idle-stop conditions are satisfied, controller 212 may initiate engine shutdown by shutting off fuel and spark to the engine. However, the engine may continue to rotate in some examples. Conversely, when restart conditions are satisfied, and/or a vehicle operator wants to launch the vehicle, controller 212 may reactivate the engine by resuming combustion in cylinders. The engine may be started via rotating the engine via DISG 14 or starter 301.

Thus, the system of FIGS. 1-3 provides for a vehicle system, comprising: a coolant loop including a positive temperature coefficient (PTC) heater submerged in a coolant, the coolant flowing through a heater core and a heat exchanger; and a heat pump including the heat exchanger. The vehicle system includes where the heater core is within a passenger cabin. The vehicle system further comprises a controller, the controlling including instructions stored in non-transitory memory for heating an engine via the PTC heater. The vehicle system further comprises additional executable instructions stored in the non-transitory memory for supplying heat to a passenger cabin. The vehicle system further comprises additional executable instructions stored in non-transitory memory for heating the passenger cabin via the PTC heater. The vehicle system further comprises an electric machine that provides power to the PTC heater during regenerative braking.

Referring now to FIG. 4, a flowchart of a method for heating portions and/or components of a vehicle is shown. The method of FIG. 4 may be stored as executable instructions non-transitory memory in the system of FIGS. 1-3. Further, the method of FIG. 4 may provide the operating sequence shown in FIG. 5. In some examples, the method of FIG. 4 may only be called when ambient temperature is less than a threshold temperature so that electrical energy may be conserved. Heat may be provided to the passenger cabin via a heat pump as shown in FIG. 2 when ambient temperature is greater than the threshold temperature. Additionally, heat may be provided to the passenger cabin via the PTC heaters and the heat pump.

At 402, method 400 judges whether or not battery state of charge (SOC) is greater than (G.T.) a threshold charge. The battery SOC may be determined via measuring battery voltage and/or counting current flow into and out of the battery. If method 400 judges that battery SOC is greater than the first threshold SOC, the answer is yes and method 400 proceeds to 420. Otherwise, the answer is no and method 400 proceeds to 404.

At 420, method 400 judges whether or not heat for the vehicle cabin is requested. In one example, a cabin heat request may be made via an operator activating a climate control input device. In other examples, a cabin heat request may be made via a climate controller. If method 400 judges that a cabin heat request is present, the answer is yes and method 400 proceeds to 422. Otherwise, the answer is no and method 400 proceeds to exit.

At 422, method 400 judges whether or not the engine is operating and combusting air and fuel. In one example, method 400 judges whether the engine is combusting air and fuel based on whether or not spark and fuel are being supplied to the engine. If method 400 judges that the engine is operating, the answer is yes and method 400 proceeds to 426. Otherwise, the answer is no and method 400 proceeds to 424.

At 424, method 400 activates PTC heaters in intermediate heat exchanger 242 to heat coolant flowing in coolant subsystem 230. Additionally if the engine is not operating, valve 250 is adjusted to a position where coolant flows through passage 252 and does not flow through internal combustion engine 12. However, if the engine is operating, valve 250 is adjusted to a position where coolant exiting the engine is directed through intermediate heat exchanger 242 and heater core 244. Additionally, if engine 12 is combusting air and fuel, valve 251 is adjusted to a position to bypass radiator 231 so as to increase heat retained in coolant flowing to heater core 244. Coolant heated by the PTC heaters is directed to heater core 244 via activating pump 254. Fan 292 may also be activated to pass cabin air though heater core 244, thereby heating the cabin air via heat exchanged between coolant flowing through heater core 244 and cabin air. Electrical current flow to PTC heaters may be feedback controlled so as to adjust coolant temperature to a desired temperature. Further, heat pump 232 may be activated by activating compressor 260 when ambient temperature is greater than a threshold temperature so that both heat pump 232 and PTC heater 265 provide heat to the coolant and passenger cabin via intermediate heat exchanger 242. If ambient temperature is greater than a second threshold ambient temperature, current flow to PTC heater 265 may stop while heat pump 232 continues to operate to advantage the heat pump's efficiency. In this way, heat may be provided to the passenger cabin solely via the heat pump, solely via the PTC heater, or by the PTC heater and the heat pump when the engine is not operating. Method 400 proceeds to exit after cabin air is heated via coolant, the heat pump, and/or PTC heaters.

It should be noted that installing PTC heaters within intermediate heat exchanger 242 allows PTC heater voltage and current to remain outside of cabin 220. Further, exposing the PTC heaters to coolant rather than air may allow a greater percentage of climate control components to be used between vehicles that are electrically propelled and vehicles that are not electrically propelled.

At 426, method 400 judges whether or not engine temperature is greater than a first threshold temperature. The engine temperature may be a cylinder head temperature, engine coolant temperature, or another engine temperature. The first threshold engine temperature may be less than a warm stabilized operating temperature for the engine (e.g., 90° C.). For example, the first threshold engine temperature may be 20° C. If method 400 judges that engine temperature is greater than the first threshold temperature, the answer is yes and method 400 proceeds to 428. Otherwise, the answer is no and method 400 proceeds to 424.

At 428, method 400 judges whether or not engine temperature is greater than a second threshold temperature. The engine temperature may be a cylinder head temperature, engine coolant temperature, or another engine temperature. The second threshold engine temperature may be slightly less than a warm stabilized operating temperature for the engine. For example, the first threshold engine temperature may be 65° C. If method 400 judges that engine temperature is greater than the second threshold temperature, the answer is yes and method 400 proceeds to 432. Otherwise, the answer is no and method 400 proceeds to 430.

At 430, method 400 activates PTC heaters in intermediate heat exchanger 242 to heat coolant flowing in coolant subsystem 230. Additionally, heat from the engine is provided to the heater core 244. In particular, valve 250 is adjusted to a position where coolant exiting the engine is directed through intermediate heat exchanger 242 and heater core 244 and coolant does not flow through passage 252. Additionally, valve 251 is adjusted to a position so that coolant exiting the engine bypasses radiator 231 so as to increase heat retained in coolant flowing to heater core 244. Coolant heated by the PTC heaters is directed to heater core 244 via activating pump 254. Thus, the engine and PTC heaters supply heat to the heater core 244. Fan 292 may also be activated to pass cabin air though heater core 244, thereby heating the cabin air via heat exchanged between coolant flowing through heater core 244 and cabin air. Electrical current flow to PTC heaters may be feedback controlled so as to adjust coolant temperature to a desired temperature. Method 400 proceeds to exit after cabin air is heated via coolant heated by the engine and PTC heaters.

Additionally, method 400 may judge whether or not ambient temperature is greater than a threshold temperature at 430. If so, the heat pump portion of the system of FIG. 2 provides heat to coolant flowing to the heater core while PTC heaters are deactivated. The heat pump may be more efficient to heat coolant than the PTC heaters when ambient temperature is greater than a threshold temperature. However, if ambient temperature is less than the threshold temperature, the PTC heaters are activated and the heat pump is deactivated. In this way, coolant in the coolant loop may be heated via the PTC heaters or the heat pump subsystem 232.

At 432, method 400 provides heat to the passenger cabin solely from coolant heated by the engine. Method 400 stops electrical current flow to PTC heaters if the PTC heaters are activated. Since the engine is up to temperature, it may provide heat sufficient to heat the passenger cabin without activating the PTC heaters so that electrical energy may be conserved. Method 400 may also adjust the position of valve 251 so that coolant flows through radiator 231 when engine temperature is at a desired temperature. Further, valve 250 is positioned to allow coolant flow from valve 251 to intermediate heat exchanger 242 and heater core 244. Method 400 proceeds to exit after coolant is provided to heat the cabin solely via the engine.

At 404, method 400 judges whether or not driver demand torque is less than (L.T.) a threshold level and if the vehicle is decelerating. In one example, driver demand torque may be determined via a position of an accelerator. Further, method 400 may judge that the vehicle is decelerating based on a reduction in vehicle speed. In still other examples, method 400 may judge whether or not the vehicle is descending a hill via a global positioning system (GPS) or other means and if driver demand torque is less than a threshold torque. If method 400 judges that driver demand torque is less than a threshold torque and if the vehicle is decelerating or descending a hill, the answer is yes and method 400 proceeds to 406. Otherwise, the answer is no and method 400 proceeds to 420.

At 406, method 400 activated regenerative braking and the vehicle's kinetic energy is converted into electrical energy via a driveline integrated starter/generator or another driveline electric machine. The electric machine operates in a generator or alternator mode while regenerative braking is activated. The electrical energy produced during regenerative braking is transferred to a vehicle power buss so that the electrical energy may be supplied to a battery, PTC heaters, and other electrically operated devices. Of course, electrical power supplied by the electric machine may be stepped up or down in voltage to adjust for component voltage limits. Method 400 proceeds to 408 after regenerative braking is activated.

At 408, method 400 directs electrical energy produced from the vehicle's kinetic energy to PTC heaters. By powering the PTC heater using the vehicle's kinetic energy while the battery is charged to a level greater than the SOC, it may be possible to heat the engine and passenger cabin without reducing the vehicle's range in an electric propulsion mode where the electric machine solely provides torque to the vehicle wheels to propel the vehicle. The electrical energy supplied to the PTC heaters may be varied in response to coolant temperature to supply a desired engine coolant temperature. The desired engine coolant temperature may be varied depending on if passenger cabin heat is requested and the present engine temperature. Method 400 proceeds to 410 after electrical energy generated during regenerative braking begins to be directed to PTC heaters.

At 410, method 400 heats the engine via PTC heaters. The engine is heated by activating the PTC heaters and adjusting the position of valve 250 so that coolant does not flow through bypass 252 and so that coolant flows through engine 12. Additionally, a position of valve 251 may be adjusted so that coolant that exits engine 12 bypasses radiator 231. Bypassing radiator 231 allows additional thermal energy to be stored in the coolant before the coolant is reheated by the PTC heaters. Heating the engine may reduce engine warm up time. Further, heating the engine may improve fuel vaporization within the engine when the engine is restarted so that less fuel is used to restart the engine and so that engine emissions may be reduced. Thus, the engine and the passenger cabin may be heated using PTC heaters without drawing electrical energy from a battery or other engine storage device during regenerative braking Operating the PTC heaters in this way may allow vehicle travel range to be maintained or extended. Method 400 proceeds to exit after PTC heaters are activated to heat the engine.

Thus, the method of FIG. 4 provides for heating a vehicle, comprising: increasing temperature of a coolant in a coolant loop that includes a heater core via supplying electrical current to a positive temperature coefficient (PTC) heater in response to ambient temperature being less than a threshold temperature; and increasing temperature of the coolant via heat transferred from a heat pump in response to ambient temperature being greater than the threshold temperature. The method includes where the PTC is positioned at the heat exchanger.

In some examples, the method further comprises not operating the heat pump when the PTC heaters are operating. The method includes where heat transferred from the heat pump is transferred via a heat exchanger. The method further comprises heating the coolant via an engine. The method further comprises deactivating the PTC heater in response to a temperature of the engine being greater than a threshold temperature. The method includes where the heat pump is a vapor compression heat pump.

The method of FIG. 4 also provides for a method for heating a vehicle, comprising: heating a passenger cabin via PTC heaters transferring heat to coolant without heating an engine in response to a request to heat the passenger cabin and while not operating in a regenerative braking mode; and heating the engine via the PTC heaters in response to entering the regenerative braking mode. The method further comprises stopping to heat the engine in response to exiting the regenerative braking mode. The method includes where an electric machine supplies power to the PTC heaters during the regenerative braking mode. The method includes where the coolant flows through a heater core.

In some examples, the method includes where the PTC heaters are positioned at a heat exchanger that transfers heat from a heat pump to the coolant. The method includes where the PTC heaters are activated in response to ambient temperature being less than a threshold temperature. The method includes where the vehicle includes an engine, and where the engine is not combusting air and fuel.

Figure 5:
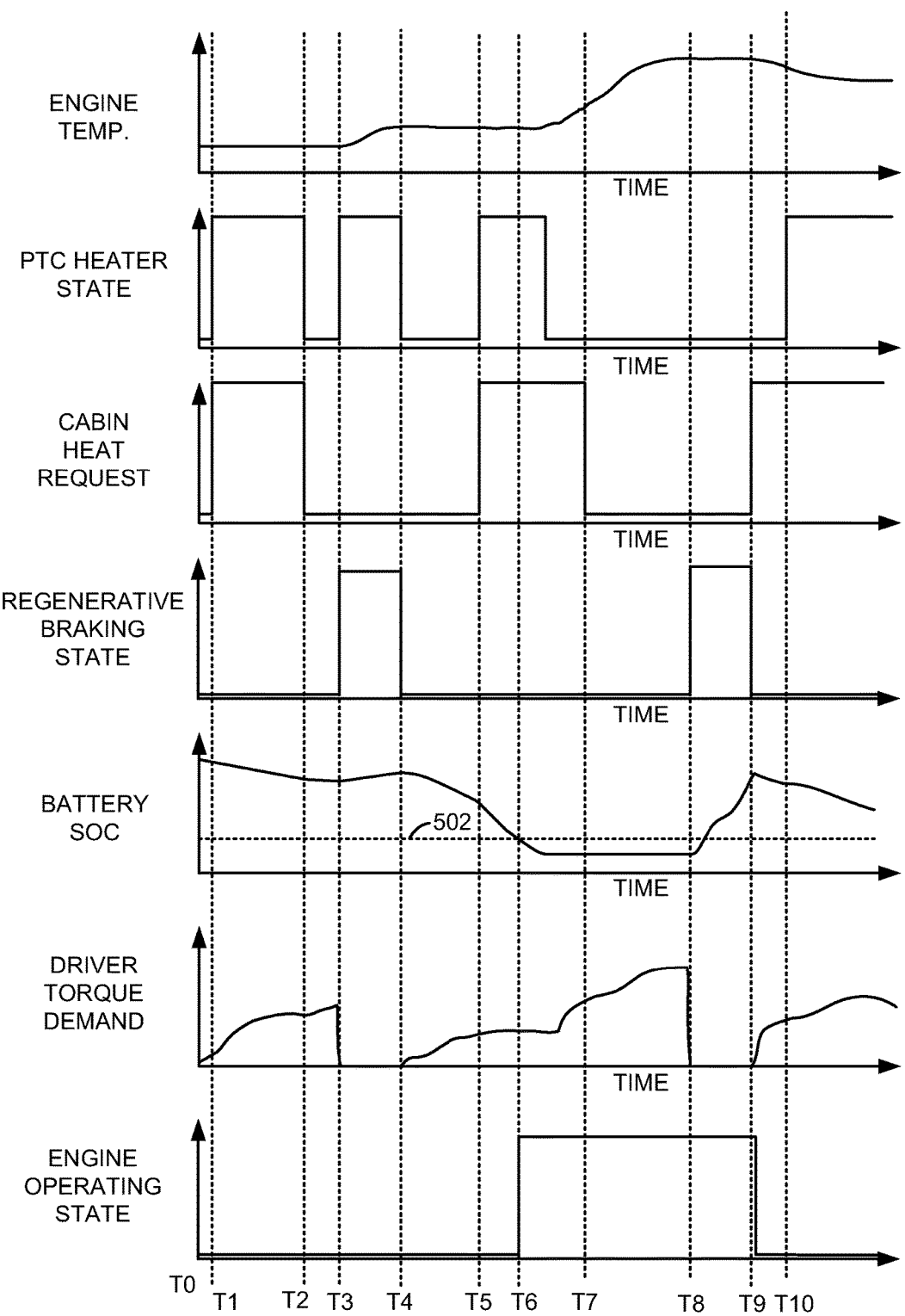
FIG. 5 shows a simulated example sequence for operating a vehicle heating system according to the method of FIG. 4.

Referring now to FIG. 5, an example simulated sequence for operating a vehicle heating system is shown. Vertical markers T0-T10 show times of interest during the operating sequence.

The first plot from the top of FIG. 5 is a plot of engine temperature versus time. The X axis represents time and time begins at the left side of the plot and increases in the direction of the X axis arrow. The Y axis represents engine temperature (e.g., engine coolant temperature, cylinder head temperature, or other engine temperature) and engine temperature increases in the direction of the Y axis arrow.

The second plot from the top of FIG. 5 is a plot of PTC heater state versus time. The X axis represents time and time begins at the left side of the plot and increases in the direction of the X axis arrow. The Y axis represents PTC heater state. The PTC heater is off when the PTC heater state is at a lower level. The PTC is activated when the PTC heater state is at a higher level.

The third plot from the top of FIG. 5 is a plot of passenger cabin heat request versus time. The X axis represents time and time begins at the left side of the plot and increases in the direction of the X axis arrow. The Y axis represents passenger heat request state. The passenger heat request is not asserted when the passenger heat request state is at a lower level. The passenger heat request is asserted when the passenger heat request state is at a higher level.

The fourth plot from the top of FIG. 5 is a plot of regenerative braking state versus time. The X axis represents time and time begins at the left side of the plot and increases in the direction of the X axis arrow. The Y axis represents regenerative braking state. The regenerative braking state is off when the regenerative braking state trace is at a lower level. Regenerative braking is activated when the regenerative braking state is at a higher level.

The fifth plot from the top of FIG. 5 is a plot of battery state of charge (SOC) versus time. The X axis represents time and time begins at the left side of the plot and increases in the direction of the X axis arrow. The Y axis represents battery SOC and battery SOC increases in the direction of the Y axis arrow. Horizontal line 302 represents a threshold level for a low battery SOC.

The sixth plot from the top of FIG. 5 is a plot of drive torque demand versus time. The X axis represents time and time begins at the left side of the plot and increases in the direction of the X axis arrow. The Y axis represents driver torque demand and driver torque demand increases in the direction of the Y axis arrow.

The seventh plot from the top of FIG. 5 is a plot of engine operating state versus time. The X axis represents time and time begins at the left side of the plot and increases in the direction of the X axis arrow. The Y axis represents engine operating state. The engine is off and not operating when the engine operating state trace is at a lower level. The engine is activated when the engine operating state is at a higher level.

At time T0, the engine is not operating and the engine temperature is at a lower level. The PTC heaters are not activated and passenger cabin heat is not being requested. The battery SOC is at a higher level and regenerative braking (e.g., braking via supplying a negative driveline torque by way of an electric machine operating in a generator mode) is not activated. The driver demand torque is also at a lower level. Such conditions may be indicative of when a vehicle has been parked and is being activated for a trip.

At time T1, the engine remains off and the driver requests passenger cabin heat. The PTC heaters are activated in response to the request for passenger cabin heat. The PTC heaters are powered via a vehicle battery. The battery state of charge is at a higher level and it begins to decrease as the PTC heaters are activated. The driver demand torque request is increased via a driver and an electric machine provides torque to vehicle wheels in response to the driver demand torque. The engine is not operated. Such conditions may be indicative of operating a hybrid vehicle having a charged battery. The engine temperature is not increased since coolant heated by the PTC heaters is bypassed around an engine and directed to a heater core.

At time T2, the driver retracts the cabin heat request and the PTC heaters are turned off in response to the absence of the passenger cabin heat request. The engine temperature remains at a lower level since the engine is not activated. The battery SOC continues to decline and the driver demand torque increases in response to a driver requesting additional torque to propel the vehicle. The vehicle has not entered a regenerative braking mode.

At time T3, the cabin heat request remains not asserted and the vehicle enters a regenerative braking mode in response to a low driver demand torque and vehicle deceleration (not shown). The PTC heaters are activated in response to the vehicle entering the regenerative braking mode, and the battery SOC being at a higher level. The engine temperature begins to increase as heat from the PTC heaters is transferred to the engine. The engine remains stopped and the battery SOC begins to increase as electrical power is supplied to PTC heater and the vehicle battery.

At time T4, the driver demand torque increases and the vehicle exits regenerative braking mode in response to the increase in driver demand torque. The PTC heaters are deactivated in response to exiting regenerative braking mode so that electrical power may be conserved for propelling the vehicle. The passenger cabin heat request remains not asserted and the battery SOC begins to be reduced. The engine continues to be in a stopped state and engine temperature levels off at a middle level.

At time T5, the driver request passenger cabin heat by asserting the cabin heat request. The PTC heaters are activated in response to the cabin heat request and heat is supplied to the passenger cabin via heated coolant. The battery SOC continues to decrease and the driver demand torque levels off at a middle level. The engine remains in a stopped state.

At time T6, the battery SOC is reduced to a level less that lower threshold 302. The engine is started and activated in response to the lower battery SOC. The driver demand torque remains steady and the PTC heaters continue to heat the coolant and the passenger cabin while the engine warms up. The vehicle is not in a regenerative braking mode and the passenger cabin heat request remains asserted. The PTC heaters are deactivated in response to the engine being started and engine coolant temperature increasing.

At time T7, the passenger cabin heat request is withdrawn. The PTC heaters remain in an off state and the engine temperature continues to increase. The battery SOC has leveled off at a lower level and the driver demand torque is increasing in response to a driver applying an accelerator pedal. The vehicle is not in a regenerative braking mode and the engine is combusting air and fuel mixtures.

At time T8, the vehicle enters a regenerative braking mode in response to a low driver demand torque and the vehicle decelerating. The PTC heaters are not activated since the engine is operating and engine temperature is at a higher level. The battery SOC increases as electrical power from regenerative braking is supplied to the battery. The passenger cabin heat request remains not asserted.

At time T9, the vehicle exits regenerative braking mode in response to an increase in driver demand torque. The engine is deactivated shortly thereafter and the electric machine provides power to propel the vehicle. The passenger cabin heat request is also asserted at time T9 in response to a driver's heat request. The PTC heaters are not activated since engine temperature is high and heat may be transferred from engine coolant to the passenger cabin. The battery SOC is at a higher level.

At time T10, the engine temperature has been reduced and the PTC heaters are activated in response to the lower engine temperature and the passenger cabin heat request. The vehicle is not in regenerative braking mode and battery SOC continues to decrease. Driver torque demand varies with the driver's torque request. The engine is not combusting air and fuel mixtures.

As will be appreciated by one of ordinary skill in the art, methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for heating a vehicle, comprising:
increasing a temperature of a coolant flowing through a heat exchanger directly coupled to an engine coolant loop by transferring electrical current to a positive temperature coefficient (PTC) heater from an energy storage device in response to a temperature of an engine being less than a first threshold temperature, where the engine coolant loop includes a heater core, where the PTC heater is included in the heat exchanger, and where the heat exchanger is directly coupled to a heat pump;
flowing the coolant with the increased temperature from the heat exchanger with the PTC heater to the heater core via a coolant conduit;
while the coolant with the increased temperature is flowed from the heat exchanger to the heater core, flowing heated coolant in the engine coolant loop from the engine to the heater core in response to the engine temperature being greater than a second threshold temperature; and
while the temperature of the coolant traveling through the heat exchanger is heated via the PTC heater, increasing the temperature of the coolant in the engine coolant loop via heat transferred from the heat pump through the heat exchanger and then to the engine coolant loop in response to an ambient temperature being greater than a threshold ambient temperature and without mixing or exchanging the coolant in the engine coolant loop with a refrigerant in the heat pump.

2. The method of claim 1, further comprising not operating the heat pump and operating the PTC heater to transfer heat to the engine coolant loop and then to the heater core.

3. The method of claim 1, where when the engine temperature is less than the second threshold temperature, the coolant bypasses a radiator.

4. The method of claim 1, wherein the engine is combusting air and fuel, and further comprising heating the coolant via the engine.

5. The method of claim 4, further comprising deactivating the PTC heater in response to the engine temperature being greater than the second threshold temperature.

6. The method of claim 1, where the heat pump is a vapor compression heat pump, and the method further comprises, when the engine temperature is greater than the second threshold temperature, passing the coolant through a radiator.

7. A method for heating a vehicle, comprising:
heating a passenger cabin via a positive temperature coefficient (PTC) heater by transferring heat to coolant in an engine coolant loop from a heat exchanger including the PTC heater without heating an internal combustion engine in response to a request to heat the passenger cabin and while not operating in a regenerative braking mode, where the heat exchanger is directly coupled to a coolant conduit in the engine coolant loop and a refrigerant conduit in a heat pump;
heating the internal combustion engine via the PTC heater in response to the vehicle initiating the regenerative braking mode and when a state of charge of an energy storage device is less than a threshold value; and
heating the internal combustion engine via the PTC heater and the heat pump without mixing or exchanging the coolant in the engine coolant loop with a refrigerant in the heat pump while the engine is shutdown;
where the PTC heater is electrically connected to a power source.

8. The method of claim 7, further comprising stopping internal combustion engine heating in response to exiting the regenerative braking mode.

9. The method of claim 7, where an electric machine performs regenerative braking in the regenerative braking mode and generates power from the regenerative braking, the electric machine supplying the power to the PTC heater during the regenerative braking mode.

10. The method of claim 7, where the coolant flows through a heater core while in the regenerative braking mode and while not in the regenerative braking mode, and wherein during the regenerative braking mode, the coolant bypasses a radiator.

11. The method of claim 7, where the coolant heated by the PTC heater does not flow through the internal combustion engine while not in the regenerative braking mode.

12. The method of claim 7, where the PTC heater is activated in response to an ambient temperature being less than a threshold temperature.

13. The method of claim 7, where the internal combustion engine is not combusting air and fuel while the passenger cabin and the internal combustion engine are heated.

* * * * *